US012666281B2

(12) United States Patent | (10) Patent No.: US 12,666,281 B2
Huang | (45) Date of Patent: Jun. 23, 2026

(54) CELL ACTIVATION METHOD, DEVICE, SYSTEM AND STORAGE MEDIUM

(71) Applicant: SHENZHEN TRANSSION HOLDINGS CO., LTD., Guangdong (CN)

(72) Inventor: Junwei Huang, Guangdong (CN)

(73) Assignee: SHENZHEN TRANSSION HOLDINGS CO., LTD., Guangddong (CN)

( * ) Notice: Subject to any disclaimer, the term of this patent is extended or adjusted under 35 U.S.C. 154(b) by 743 days.

(21) Appl. No.: 18/566,675

(22) PCT Filed: Jul. 7, 2020

(86) PCT No.: PCT/CN2020/100666
§ 371 (c)(1),
(2) Date: Dec. 4, 2023

(87) PCT Pub. No.: WO2022/006743
PCT Pub. Date: Jan. 13, 2022

(65) Prior Publication Data
US 2024/0214837 A1 Jun. 27, 2024

(51) Int. Cl.
*H04W 24/02* (2009.01)
(52) U.S. Cl.
CPC .................................. *H04W 24/02* (2013.01)
(58) Field of Classification Search
CPC ....... H04W 24/02; Y02D 30/70; H04L 5/0053
See application file for complete search history.

(56) References Cited

U.S. PATENT DOCUMENTS

| 2015/0117287 A1* | 4/2015 | Kim .................. | H04W 56/0045 |
| | | | 370/311 |
| 2015/0215929 A1* | 7/2015 | Damnjanovic ....... | H04W 72/21 |
| | | | 370/241 |
| 2016/0056939 A1* | 2/2016 | Kim ...................... | H04W 24/10 |
| | | | 370/331 |
| 2016/0278073 A1* | 9/2016 | Dinan ................... | H04L 5/0057 |
| 2016/0278083 A1* | 9/2016 | Dinan ................... | H04L 5/0053 |
| 2017/0041880 A1* | 2/2017 | Ouchi ................... | H04L 5/0053 |
| 2019/0124558 A1* | 4/2019 | Ang ...................... | H04L 5/0098 |
| 2019/0306835 A1 | 10/2019 | Hoang et al. | |
| 2020/0059343 A1 | 2/2020 | Kim et al. | |

(Continued)

FOREIGN PATENT DOCUMENTS

| CN | 106537964 | 3/2017 |
| CN | 107925547 | 4/2018 |

(Continued)

OTHER PUBLICATIONS

OPPO, "SCell or SCG activation in RRC_Inactive." 3GPP TSG-RAN WG2 Meeting #107bis, R2-1912288, Oct. 14-18, 2019, pp. 1-3.

(Continued)

*Primary Examiner* — Afshawn M Towfighi
(74) *Attorney, Agent, or Firm* — JCIPRNET

(57) ABSTRACT

Embodiments of the present application provide a cell activation method, a device, a system and a storage medium. The method includes: receiving indication information, where the indication information is configured for determining SCGs to be activated and/or activation time; activating the SCGs according to the indication information.

20 Claims, 4 Drawing Sheets

(56)                    References Cited

U.S. PATENT DOCUMENTS

| | | | | |
|---|---|---|---|---|
| 2021/0136689 A1* | 5/2021 | Kim | ................. | H04W 52/0235 |
| 2022/0030616 A1* | 1/2022 | Xiao | .................... | H04W 72/23 |

FOREIGN PATENT DOCUMENTS

| | | |
|---|---|---|
| CN | 111194074 | 5/2020 |
| CN | 111225396 | 6/2020 |
| CN | 111315027 | 6/2020 |
| WO | 2019078356 | 4/2019 |

OTHER PUBLICATIONS

ETSI MCC, "Report of 3GPP TSG RAN2#109-e meeting, Online." 3GPP TSG-RAN WG2 meeting #109bis-e, R2-2002501, Feb. 24-Mar. 6, 2020, pp. 1-369.

ETSI MCC, "Report of 3GPP TSG RAN2#108 meeting, Reno, USA." 3GPP TSG-RAN WG2 meeting #109-e, R2-2000009, Nov. 18-22, 2019, pp. 1-323.

MCC Support, "Final Report of 3GPP TSG RAN WG1 #99 v1.0.0." 3GPP TSG RAN WG1 Meeting #100-e, R1-2000151, Feb. 24-Mar. 6, 2020, pp. 1-163.

MCC Support, "Final Report of 3GPP TSG RAN WG1 #98bis v2.0.0 (Chongqing, China, Oct. 14-20, 2019)" 3GPP TSG RAN WG1 Meeting #99, R1-1913275, Nov. 18-22, 2019, pp. 1-160.

MCC Support, "Draft Report of 3GPP TSG RAN WG1 #100-e v0.2.0 (Online meeting, Feb. 24-Mar. 6, 2020)" 3GPP TSG RAN WG1 Meeting #100bis, R1-20xxxxx, Apr. 20-24, 2020.

Qualcomm, "Updated consolidated parameter list for Rel-16 NR," 3GPP TSG-RAN WG1 #100-e, R1-2001478, Feb. 24-Mar. 6, 2020, pp. 1-294.

Huawei, "Revised WID on Further Multi-RAT Dual-Connectivity enhancements," 3GPP TSG RAN Meeting #88e, RP-201040, Jun. 29-Jul. 3, 2020, pp. 1-4.

"International Search Report (Form PCT/ISA/210) of PCT/CN2020/100666," mailed on Apr. 1, 2021, with English translation thereof, pp. 1-6.

"Written Opinion of the International Searching Authority (Form PCT/ISA/237) of PCT/ CN2020/100666," mailed on Apr. 1, 2021, with English translation thereof, pp. 1-5.

"Office Action of China Counterpart Application", issued on Mar. 29, 2022, with partial English translation thereof, p. 1- p. 10.

"Notice of Allowance of China Counterpart Application," issued on Dec. 5, 2022, with English translation thereof, pp. 1-7.

* cited by examiner

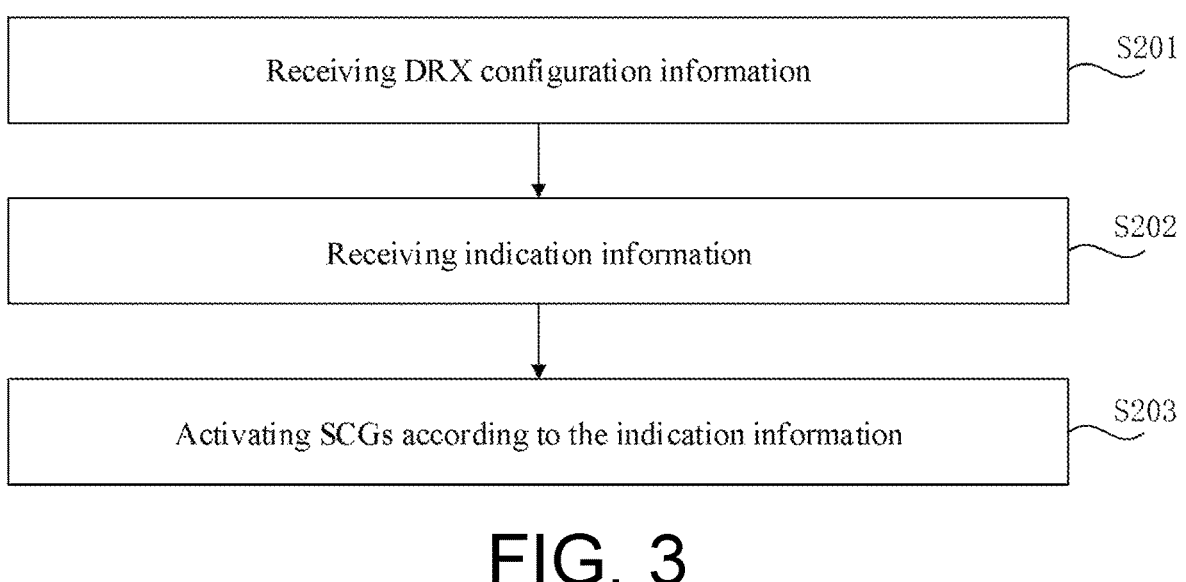

| Receiving DRX configuration information | S201 |
| Receiving indication information | S202 |
| Activating SCGs according to the indication information | S203 |

FIG. 3

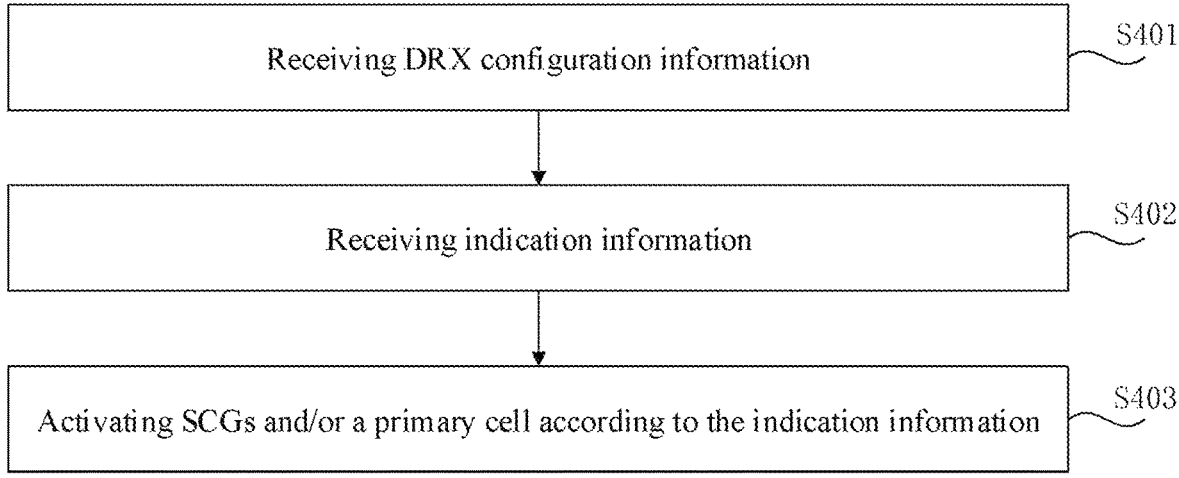

| Receiving indication information | S301 |
| Activating SCGs and/or a primary cell according to the indication information | S302 |

FIG. 4

| Receiving DRX configuration information | S401 |
| Receiving indication information | S402 |
| Activating SCGs and/or a primary cell according to the indication information | S403 |

FIG. 5

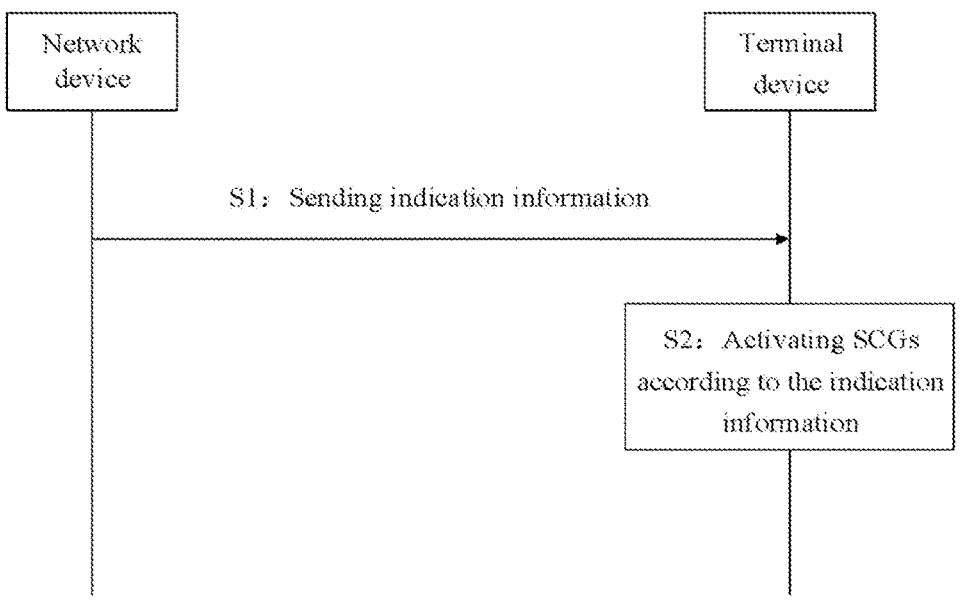
FIG. 6
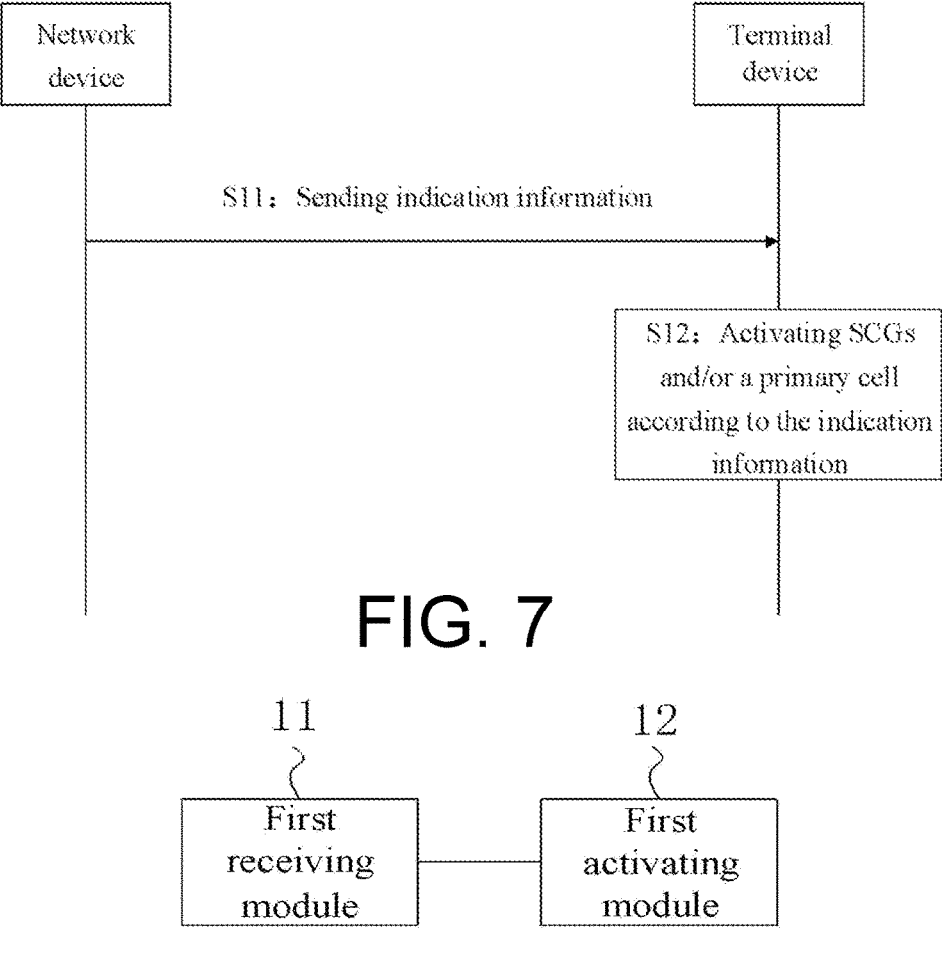
FIG. 7
11                    12
First
receiving
module
First
activating
module
FIG. 8

CELL ACTIVATION METHOD, DEVICE, SYSTEM AND STORAGE MEDIUM

CROSS-REFERENCE TO RELATED APPLICATION

The present application is a National Stage of the International Application No. PCT/CN2020/100666, filed on Jul. 7, 2020, titled "CELL ACTIVATION METHOD, DEVICE, SYSTEM AND STORAGE MEDIUM", which is hereby incorporated by reference in its entirety.

TECHNICAL FIELD

Embodiments of the present application relate to communication technology and, in particular, to a cell activation method, a device, a system and a storage medium.

BACKGROUND

With the development of communication technology, how to achieve quick activation for a terminal device such as a user equipment (UE) to reduce communication latency has become an urgent problem to be solved.

In some implementations, a network device can utilize indication information to quickly activate secondary cell groups (SCGs), and a terminal device can quickly activate and monitor secondary cells after receiving the indication information.

However, the inventors found that at least the following problem exists in the above implementations: the network device cannot give indication for different secondary cell groups to be activated, resulting in low flexibility in utilization of the indication information.

The foregoing description is intended to provide general background information and does not necessarily constitute prior art.

SUMMARY

Embodiments of the present application provide a cell activation method, a device, a system and a storage medium, for solving the problem of low flexibility in utilization of indication information.

In an aspect, embodiments of the present application provide a cell activation method, where the method is applied to a terminal device, and the method includes:

receiving indication information, where the indication information is configured for determining secondary cell groups (SCGs) to be activated and/or activation time; activating the SCGs according to the indication information.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining activation time of the SCGs; and/or, the indication information includes at least one scrambled bit, and the scrambled bit is configured for determining activation time of a primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

activation time of the SCGs, activation time of a primary cell.

In some embodiments, the indication information includes at least one preset bit, and the preset bit is configured for determining the activation time of the SCGs; and/or, the indication information includes at least one scrambled bit, and the scrambled bit is configured for determining activation time of a primary cell.

In some embodiments, the indication information includes at least one third preset bit, and the third preset bit is configured for determining activation time of a primary cell.

In some embodiments, the indication information further includes a fourth preset bit or a third preset indication field, and the fourth preset bit or the third preset indication field is configured for determining a primary cell to be activated.

In some embodiments, the activating the SCGs according to the indication information includes:

activating the SCGs and/or the primary cell according to the indication information.

In some embodiments, the activating the SCGs according to the indication information includes:

activating the SCGs in an active time duration according to the indication information.

In some embodiments, the method further includes:

receiving DRX (Discontinuous Reception) configuration information, where the configuration information is configured for determining an active time duration (Active Time) and/or an outside-active time duration (Outside Active Time).

In some embodiments, the SCGs include:

at least one secondary cell group for dormancy outside active time; and/or at least one secondary cell group for dormancy within active time.

In another aspect, embodiments of the present application provides a cell activation method, where the method is applied to a terminal device, and the method includes:

receiving indication information, where the indication information is configured for determining SCGs to be activated and/or activation time of a primary cell;

activating the SCGs and/or the primary cell according to the indication information.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the activating the SCGs according to the indication information includes activating the SCGs in an active time duration.

In some embodiments, the method further includes:

receiving DRX configuration information, where the configuration information is configured for determining an active time duration and/or an outside-active time duration.

In another aspect, embodiments of the present application provides a cell activation method, where the method is applied to a network device, and the method includes: sending indication information, where the indication information is configured for determining SCGs to be activated and/or activation time.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining the activation time of the SCGs; and/or, the indication information includes at least one scrambled bit, and the scrambled bit is configured for determining activation time of a primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

activation time of the SCGs, activation time of a primary cell.

In some embodiments, the indication information includes at least one preset bit, and the preset bit is configured for determining the activation time of the SCGs; and/or, the indication information includes at least one scrambled bit, and the scrambled bit is configured for determining activation time of a primary cell.

In some embodiments, the indication information includes at least one third preset bit, and the third preset bit is configured for determining activation time of a primary cell.

In some embodiments, the indication information further includes a fourth preset bit or a third preset indication field, and the fourth preset bit or the third preset indication field is configured for determining a primary cell to be activated.

In some embodiments, the method further includes:

sending DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

In another aspect, embodiments of the present application provide a cell activation method, where the method is applied to a network device, and the method includes:

sending indication information, where the indication information is configured for determining SCGs to be activated and/or activation time of a primary cell.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the method further includes:

sending DRX configuration information, where the configuration information is configured for determining an active time duration and/or an outside-active time duration.

In another aspect, embodiments of the present application provides a terminal device, including:

a first receiving module, configured to receive indication information, where the indication information is configured for determining SCGs to be activated and/or activation time;

a first activating module, configured to activate the SCGs according to the indication information.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining activation time of the SCGs; and/or, the indication information includes at least one scrambled bit, and the scrambled bit is configured for determining activation time of a primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

activation time of the SCGs, activation time of a primary cell.

In some embodiments, the indication information includes at least one preset bit, and the preset bit is configured for determining activation time of the SCGs; and/or, the indication information includes at least one scrambled bit, and the scrambled bit is configured for determining activation time of a primary cell.

In some embodiments, the indication information includes at least one third preset bit, and the third preset bit is configured for determining activation time of a primary cell.

In some embodiments, the indication information further includes a fourth preset bit or a third preset indication field, and the fourth preset bit or the third preset indication field is configured for determining a primary cell to be activated.

In some embodiments, the first activating module is configured to activate the SCGs and/or the primary cell according to the indication information.

In some embodiments, the first activating module is configured to activate the SCGs in an active time duration according to the indication information.

In some embodiments, the first receiving module is configured to receive DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

In another aspect, embodiments of the present application provide a terminal device, including:

a second receiving module, configured to receive indication information, where the indication information is configured for determining SCGs to be activated and/or activation time of a primary cell;

a second activating module, configured to activate the SCGs and/or the primary cell according to the indication information.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the second activating module is configured to activate the SCGs in an active time duration.

In some embodiments, the second receiving module is configured to receive DRX configuration information, where the configuration information is configured for determining an active time duration and/or an outside-active time duration.

In another aspect, embodiments of the present application provide a network device, including:

a third sending module, configured to send indication information, where the indication information is configured for determining SCGs to be activated and/or activation time.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining activation time of the SCGs; and/or.

the indication information includes at least one scrambled bit, and the scrambled bit is configured for determining activation time of a primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

activation time of the SCGs, activation time of a primary cell.

In some embodiments, the indication information includes at least one preset bit, and the preset bit is configured for determining activation time of the SCGs; and/or, the indication information includes at least one scrambled bit, and the scrambled bit is configured for determining activation time of a primary cell.

In some embodiments, the indication information includes at least one third preset bit, and the third preset bit is configured for determining activation time of a primary cell.

In some embodiments, the indication information further includes a fourth preset bit or a third preset indication field, and the fourth preset bit or the third preset indication field is configured for determining a primary cell to be activated.

In some embodiments, the third sending module is configured to send DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

In another aspect, embodiments of the present application provide a network device, including:

a fourth sending module, configured to send indication information, where the indication information is configured for determining SCGs to be activated and/or activation time of a primary cell.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the fourth sending module is configured to send DRX configuration information, where the configuration information is configured for determining an active time duration and/or an outside-active time duration.

In another aspect, embodiments of the present application provide a device, including: a processor and a memory;

the memory stores computer execution instructions;

when the computer execution instructions are executed by the processor, the cell activation method as described in any of the aforesaid embodiments is implemented.

In another aspect, embodiments of the present application provide a system, which includes the terminal device as described in any of the aforesaid embodiments and the network device as described in any of the aforesaid embodiments.

In another aspect, embodiments of the present application provide a computer-readable storage medium, which stores computer execution instructions therein, and when the computer execution instructions are executed by a processor, the cell activation method as described in any of the aforesaid embodiments is implemented.

The present application provides a cell activation method, a device, a system and a storage medium, where the method includes: receiving the indication information, where the indication information is configured for determining the SCGs to be activated and/or the activation time; activating the SCGs according to the indication information. By determining the SCGs to be activated and/or the activation time through the indication information, flexibility of the indication information being used for indication can be improved, a technical effect of improving reliability of activating the SCGs by the terminal device can be achieved, and a technical effect of reducing activation latency can also be achieved.

BRIEF DESCRIPTION OF DRAWINGS

The accompanying drawings, which are incorporated in and constitute a part of this description, illustrate embodiments consistent with the present application, and together with the description, serve to explain the principles of the present application.

FIG. 3 is a schematic flowchart of a cell activation method according to another embodiment of the present application;

FIG. 4 is a schematic flowchart of a cell activation method according to another embodiment of the present application;

FIG. 5 is a schematic flowchart of a cell activation method according to another embodiment of the present application;

FIG. 6 is a schematic diagram of interaction of a cell activation method according to an embodiment of the present application;

FIG. 7 is a schematic diagram of interaction of a cell activation method according to another embodiment of the present application;

FIG. 8 is a schematic diagram of a terminal device according to an embodiment of the present application;

Figure 1:
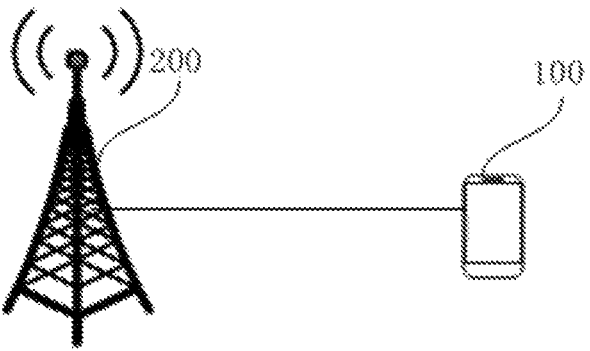
FIG. 1 is a schematic diagram of an application scenario of a cell activation method of the present application.

Through the above drawings, clear embodiments of the present application have been shown, which will be described in more detail later. These drawings and written descriptions are not intended to limit the scope of the concept of the present application in any way, but to explain the concept of the present application to those skilled in the art by referring to specific embodiments.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The implementations described in the following exemplary embodiments do not represent all implementations consistent with this application. Rather, they are merely examples of apparatuses and methods consistent with some aspects of the present application as detailed in the appended claims.

It should be noted that the terms "including". "comprising" or any other variation thereof herein are intended to cover non-exclusive inclusion, so that a process, method, article or apparatus including a series of elements includes not only those elements, but also other elements not explicitly listed, or elements inherent to such process, method, article or apparatus. Without more restrictions, an element defined by the phrase "including a" does not exclude the existence of other identical elements in the process, method, article or apparatus including this element. In addition, the components, features and elements with the same name in different embodiments of the present application may have the same or different meanings, and the specific meanings need to be determined by their explanations in the specific embodiments or further in combination with the context in the specific embodiments.

It should be understood that although the terms "first", "second", "third" and the like may be used herein to describe various information, such information should not be limited to these terms. These terms are only used to distinguish the same type of information from each other. For example, first information may also be named as second information without departing from the scope of the present application, and similarly, second information may also be named as first information. Depending on the context, the word "if" as used herein can be interpreted as "in a case that" or "when" or "in response to determining". Furthermore, as used herein, the singular forms "a/an". "one" and "the" are intended to also include the plural forms, unless the context indicates to the contrary. It should be further understood that the terms "including" and "comprising" indicate the presence of the stated feature, step, operation, element, component, item, category and/or group, but do not exclude the presence, appearance or addition of one or more other features, steps, operations, elements, components, items, categories and/or groups. The terms "or" and "and/or" as used herein are to be interpreted as inclusive or mean any one or any combination. Therefore, "A, B or C" or "A. B and/or C" means "any of the following: A: B; C; A and B: A and C: B and C: A, B and C". An exception to this definition occurs only when there is a combination of elements, functions, steps or operations which are inherently exclusive of each other in some way.

It should be understood that although the steps in flowcharts in the present application are displayed in sequence as indicated by arrows, these steps are not necessarily executed in sequence as indicated by arrows. Unless explicitly stated herein, the execution of these steps is not strictly limited in order, and the steps can be executed in other orders. Moreover, at least part of the steps in the diagram may include a plurality of sub-steps or a plurality of stages, which may not necessarily be completed at the same time, but may be executed at different times. Their execution order may not necessarily be sequential, but may be executed with other steps or sub-steps of other steps or at least part of stages in turn or be executed alternately with other steps or sub-steps of other steps or at least part of stages.

The cell activation method in embodiments of the present application can be applied to an application scenario shown in FIG. 1.

FIG. 1 can be understood as a system for cell activation, which includes a network device and a terminal device. In the application scenario shown in FIG. 1, the terminal device is a mobile phone 100 and the network device is a base station 200.

A communication link can be established between the mobile phone 100 and the base station 200, and the mobile phone 100 can conduct data transmission with the base station 200 based on the communication link.

It is worth noting that only one type of the terminal device is exemplarily shown in FIG. 1, and the terminal device may also include a desktop computer, a laptop, an iPad, a smart bracelet, etc. In addition to the base station shown in FIG. 1, network devices may also include a router, a bridge, etc.

Specifically, the application scenario described in FIG. 1 can be applied to different network standards, such as global system of mobile communication (GSM), code division multiple access (CDMA), wideband code division multiple access (WCDMA), time division-synchronous code division multiple access (TD-SCDMA), a long term evolution (LTE) system, 5G NR (New Radio) and other network standards. In an embodiment, the above communication system may be a system in a scenario of ultra-reliable and low latency communications (URLLC) transmission in a 5G communication system.

Therefore, in an embodiment, the aforesaid base station may be a base station (Base Transceiver Station, BTS) and/or a base station controller in GSM or CDMA, or a base station (NodeB, NB) and/or a radio network controller (RNC) in WCDMA. The base station may also be an evolved base station (Evolved Node B, eNB or eNodeB) in LTE, a relay station or an access point, or a base station (gNB) in a 5G NR network, which is not limited in the present application.

The aforesaid terminal device may be a wireless terminal or a wired terminal. A wireless terminal may refer to a device that provides voice and/or other service data connectivity to users, a handheld device with a wireless connection function, or other processing devices connected to a wireless modem. The wireless terminal can communicate with one or more core network devices via a radio access network (RAN). The wireless terminal may be a mobile terminal, such as a mobile phone (or a "cellular" phone), and a computer with a mobile terminal, such as a portable, pocket-sized, handheld, computer-built or vehicle-mounted mobile device, which exchanges voice and/or data with the radio access network. For another example, the wireless terminal may also be a personal communication service (PCS) phone, a cordless phone, a session initiation protocol (SIP) phone, a wireless local loop (WLL) station, a personal digital assistant (PDA) and other devices. The wireless terminal may also be referred to as a system, a subscriber unit, a subscriber station, a mobile station, a mobile, a remote station, a remote terminal, an access terminal, a user terminal, a user agent, a user device or user equipment, which is not limited in the present application. In an embodiment, the aforesaid user equipment may also be a smart watch, a tablet computer, and other devices.

The technical solutions of the embodiments of the present application and how the technical solutions of the present application solve the above technical problems will be described in detail with specific embodiments. The following several specific embodiments can be combined with each other, and the same or similar concepts or processes may not be repeated in some embodiments. Hereinafter, embodiments of the present application will be described with reference to the accompanying drawings.

According to an aspect of the embodiments of the present application, embodiments of the present application provide a cell activation method applied to the above application scenario, which can be applied to a terminal device.

Figure 2:
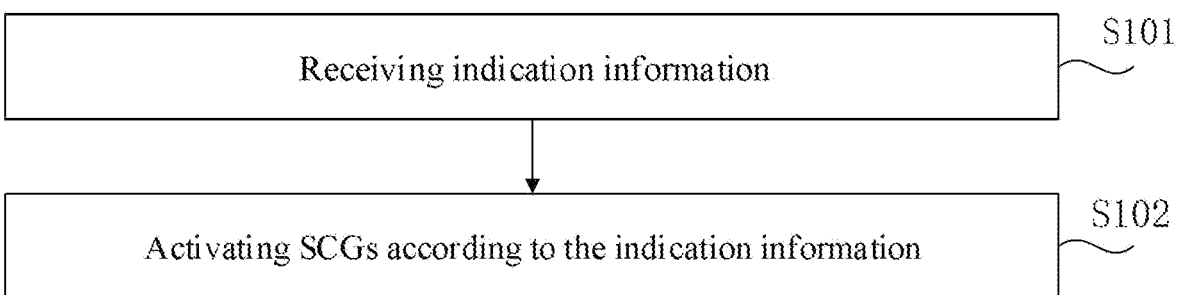
FIG. 2 is a schematic flowchart of a cell activation method according to an embodiment of the present application.

Please refer to FIG. 2, which is a schematic flowchart of a cell activation method according to an embodiment of the present application.

As shown in FIG. 2, the method includes the following steps.

S101: receiving indication information, where the indication information is configured for determining SCGs to be activated and/or activation time.

An execution entity of the embodiment of the present application may be a terminal device, and the description of the above examples can be referred to for the description of types of the terminal device, which will not be repeated here.

For example, when the cell activation method of the embodiment of the present application is applied to the application scenario as shown in FIG. 1, the execution entity of the embodiment of the present application may be the mobile phone as shown in FIG. 1.

In this embodiment, the cell activation method of embodiment of the present application is exemplarily expounded by taking the mobile phone as an example of the terminal device.

That is, in the embodiment of the present application, the mobile phone can receive the indication information sent by the network device, such as a PDCCH-WUS (Physical Downlink Control Channel-Wake-up signal). In some embodiments, the indication information can be configured for determining the secondary cell groups (SCGs) to be activated; in some other embodiments, the indication information can be configured for determining the activation time; in some other embodiments, the indication information can be configured for determining the SCGs and the activation time.

S102: activating the SCGs according to the indication information.

Based on the above example, in this step, when receiving the indication information, the mobile phone can activate the SCGs.

It should be noted that in the above example, the mobile phone is taken as an example only for exemplary explanation, which cannot be understood as a limitation on the execution entity of the cell activation method in the embodiments of the present application.

In this embodiment, as the terminal device (such as the mobile phone in the above example) can activate the SCGs according to the indication information, the terminal device can determine the SCGs conveniently and quickly according to the indication information and activate the SCGs, which can reduce interaction resources between the terminal device and the network device and save energy consumption for activation by the terminal device.

Based on the above analysis, the embodiments of the present application provide a new cell activation method, which includes: receiving the indication information, where the indication information is configured for determining the SCGs to be activated and/or the activation time, and activating the SCGs according to the indication information. By determining the SCGs to be activated and/or the activation time through the indication information, flexibility of the indication information being used for indication can be improved, a technical effect of improving reliability of activating the SCGs by the terminal device can be achieved, and a technical effect of reducing activation latency can also be achieved.

In some embodiments, the indication information includes at least one first preset bit, and the first preset bit is configured for determining the SCGs.

That is, the indication information may include one first preset bit or a plurality of first preset bits.

When the indication information includes one first preset bit, the SCGs can be determined by the one first preset bit. When the indication information includes a plurality of first preset bits, the SCGs can be determined by the plurality of first preset bits.

In some embodiments, if the indication information includes one first preset bit, SCGs of a certain type are determined when a value in the first preset bit is a first value; SCGs of another type are determined when the value in the preset bit is a second value.

Similarly, in some embodiments, if the indication information includes a plurality of first preset bits, based on values of the plurality of first preset bits, the SCGs can be determined according to the values of the plurality of first preset bits.

In some embodiments, the indication information further includes at least one second preset bit, and the second preset bit is configured for determining at least one of the following:

activation time of the SCGs, activation time of a primary cell.

That is, in the embodiments of the present application, the indication information may include one second preset bit or a plurality of second preset bits.

In some embodiments, when the indication information includes one second preset bit, it may be the case that the activation time of the SCGs can be determined based on the one second preset bit; it may also be the case that the activation time of the primary cell can be determined based on the one second preset bit; it may also be the case that the activation time of the SCGs and the activation time of the primary cell can be determined based on the one second preset bit.

That is, in some embodiments, the SCGs can be determined by at least one first preset bit included in the indication information, and the activation time of the SCGs can be determined by at least one second preset bit included in the indication information.

In some other embodiments, the SCGs can be determined by at least one first preset bit included in the indication information, and the activation time of the primary cell can be determined by at least one second preset bit included in the indication information.

In some other embodiments, the SCGs can be determined by at least one first preset bit included in the indication information, and the activation time of the SCGs can be determined by at least one second preset bit included in the indication information, and the activation time of the primary cell can also be determined by at least one second preset bit included in the indication information.

In some embodiments, the indication information includes at least one preset indication field, and the preset indication field is configured for determining the activation time of the SCGs; and/or, the indication information includes at least one scrambled bit, and the scrambled bit is configured for determining the activation time of the primary cell.

That is, in the embodiments of the present application, the indication information may include one preset indication field, and the activation time of the SCGs is determined by the one preset indication field; the indication information may also include a plurality of preset indication fields, and the activation time of the SCGs is determined by the plurality of preset indication fields.

In some embodiments, if the indication information includes one preset indication field, when a value in the preset indication field is a certain value, the activation time of the SCGs can be determined by this value.

In some other embodiments, if the indication information includes a plurality of preset indication fields, values in the plurality of preset indication fields are respectively obtained, and the activation time of the SCGs is determined according to a plurality of values.

Moreover, in the embodiments of the present application, the indication information may include one scrambled bit, and the activation time of the primary cell is determined by the one scrambled bit: the indication information may also include a plurality of scrambled bits, and the activation time of the primary cell is determined by one or more of the scrambled bits.

For example, by scrambling the first bit or the last bit of the indication information with at least one bit, and by obtaining a value of the bit for scrambling the first bit or the last bit of the indication information, the activation time of the primary cell can be determined. In an embodiment, in addition to being placed at the starting position or the end position of the indication information, the scrambling bit may also be placed at any position in the middle of the indication information.

Based on the above examples, it can be known that the SCGs can be determined by at least one preset bit included in the indication information. In some embodiments, the SCGs can be determined by at least one preset bit included in the indication information, and the activation time of the SCGs can be determined by at least one preset indication field included in the indication information. In some other embodiments, the SCGs can be determined by at least one preset bit included in the indication information, and the activation time of the primary cell can be determined by at least one scrambled bit included in the indication information. In some other embodiments, the SCGs can be determined by at least one preset bit included in the indication information, and the activation time of the SCGs can be determined by at least one preset indication field included in the indication information, and the activation time of the primary cell can also be determined by at least one scrambled bit included in the indication information.

In some embodiments, the indication information includes at least one first preset indication field, and the first preset indication field is configured for determining the SCGs.

That is, in the embodiments of the present application, the indication information may include one first preset indication field, and the SCGs are determined by the one first preset indication field. The indication information may also include a plurality of first preset indication fields, and the SCGs may be determined by the plurality of first preset indication fields.

In some embodiments, if the indication information includes one first preset indication field, SCGs of a certain type are determined when a value in the first preset indication field is a first value; SCGs of another type are determined when the value in the preset indication field is a second value.

Similarly, in some embodiments, if the indication information includes a plurality of first preset indication fields, based on values of the plurality of first preset indication fields, the SCGs can be determined according to the values of the plurality of first preset indication fields.

In some embodiments, the indication information includes at least one second preset indication field, and the second preset indication field is configured for determining at least one of the following:

the activation time of the SCGs, the activation time of the primary cell.

That is, in the embodiments of the present application, the indication information may include one second preset indication field or a plurality of second preset indication fields.

In some embodiments, when the indication information includes one second preset indication field, it may be the case that the activation time of the SCGs can be determined based on the second preset indication field; it may also be the case that the activation time of the primary cell can be determined based on the second preset indication field; it may also be the case that the activation time of the SCGs and the activation time of the primary cell can be determined based on the second preset indication field.

That is, in some embodiments, the SCGs can be determined by at least one first preset indication field included in the indication information, and the activation time of the SCGs can be determined by at least one second preset indication field included in the indication information.

In some other embodiments, the SCGs can be determined by at least one first preset indication field included in the indication information, and the activation time of the primary cell can be determined by at least one second preset indication field included in the indication information.

In some other embodiments, the SCGs can be determined by at least one first preset indication field included in the indication information, and the activation time of the SCGs can be determined by at least one second preset indication field included in the indication information, and the activation time of the primary cell can also be determined by at least one second preset indication field included in the indication information.

In some embodiments, the indication information includes at least one preset bit, and the preset bit is configured for determining the activation time of the SCGs; and/or.

the indication information includes at least one scrambled bit, and the scrambled bit is configured for determining the activation time of the primary cell.

That is, in the embodiments of the present application, the indication information may include one preset bit, and the activation time of the SCGs is determined by the one preset bit: the indication information may also include a plurality of preset bits, and the activation time of the SCGs can be determined by the plurality of preset bits.

In some embodiments, if the indication information includes one preset bit, when a value in the preset bit is a certain value, the activation time of the SCGs can be determined by this value.

In some other embodiments, if the indication information includes a plurality of preset bits, values in the plurality of preset bits are respectively obtained, and the activation time of the SCGs is determined according to a plurality of values.

Moreover, in the embodiments of the present application, the indication information may include one scrambled bit, and the activation time of the primary cell is determined by the one scrambled bit; the indication information may also include a plurality of scrambled bits, and the activation time of the primary cell is determined by one or more of the scrambled bits.

For example, by scrambling the first bit or the last bit of the indication information with at least one bit, and by obtaining a value of the bit for scrambling the first bit or the last bit of the indication information, the activation time of the primary cell can be determined. In an embodiment, in addition to being placed at the starting position or the end position of the indication information, the scrambling bit may also be placed at any position in the middle of the indication information.

Based on the above examples, it can be known that the SCGs can be determined by at least one preset indication field included in the indication information. In some embodiments, the SCGs can be determined by at least one preset indication field included in the indication information, and the activation time of the SCGs can be determined by at least one preset bit included in the indication information. In some other embodiments, the SCGs can be determined by at least one preset indication filed included in the indication information, and the activation time of the primary cell can be determined by at least one scrambled bit included in the indication information. In some other embodiments, the SCGs can be determined by at least one preset indication filed included in the indication information, and the activation time of the SCGs can be determined by at least one preset bit included in the indication information, and the activation time of the primary cell can also be determined by at least one scrambled bit included in the indication information.

In some embodiments, the indication information includes at least one third preset bit, and the third preset bit is configured for determining the activation time of the primary cell.

That is, in the embodiments of the present application, the indication information may include one third preset bit, and the activation time of the primary cell is determined by the one third preset bit. The indication information may also include a plurality of third preset bits, and the activation time of the primary cell is determined by the plurality of third preset bits.

In some embodiments, if the indication information includes one third preset bit, the activation time of the primary cell is determined by a value in the third preset bit.

Similarly, in some embodiments, if the indication information includes a plurality of third preset bits, the activation time of the primary cell can be determined based on values of the plurality of third preset bits.

In some embodiments, the indication information further includes a fourth preset bit or a third preset indication field, and the fourth preset bit or the third preset indication field is configured for determining a primary cell to be activated.

That is, in some embodiments, the indication information can be configured for determining the SCGs and/or activation time, and the indication information can also be configured for determining the primary cell. The primary cell can be determined by the fourth preset bit or the third preset indication field included in the indication information. For the implementation method of determining the SCGs and/or the activation time by the indication information, please refer to the above examples, which will not be repeated here.

Of course, in some other embodiments, the indication information can be configured for determining the SCGs, the activation time of the SCGs and the activation time of the primary cell, and can also be configured for determining the primary cell. For the implementation method of determining the SCGs, the activation time of the SCGs and the activation time of the primary cell by the indication information, please refer to the above examples, which will not be repeated here.

In some embodiments, S102 includes: activating the SCGs and/or the primary cell according to the indication information.

For example, if the indication information is configured for determining the SCGs, then the SCGs are activated.

For another example, if the indication information is configured for determining the primary cell, then the primary cell is activated.

For another example, if the indication information is configured for determining the SCGs and for determining the primary cell, then the SCGs and the primary cell are activated.

For another example, if the indication information is configured for determining the SCGs and for determining the activation time of the SCGs, then the SCGs are activated at the activation time of the SCGs.

For another example, if the indication information is configured for determining the primary cell and for determining the activation time of the primary cell, then the primary cell is activated at the activation time of the primary cell.

For another example, if the indication information is configured for determining the SCGs and the activation time of the SCGs, and for determining the primary cell and the activation time of the primary cell, then the SCGs are activated at the activation time of the SCGs, and the primary cell is activated at the activation time of the primary cell.

For the implementation method of determining the SCGs, the activation time of the SCGs, the primary cell and the activation time of the primary cell by the indication information, please refer to the above examples, which will not be repeated here.

In some embodiments, S102 includes: activating the SCGs in an active time duration according to the indication information.

In some embodiments, the activation time may be activation time of the SCGs in the active time duration, and specific activation time may be at least part of the active time duration, that is, the activation time may be the active time duration or a partial time duration within the active time duration.

Therein, a partial active time duration may include: the first half of the active time duration, the second half of the active time duration and any time duration of the active time duration, which is not limited in the embodiments of the present application.

For example, if the indication information is configured for determining the SCGs, then the SCGs are activated in the active time duration.

For another example, if the indication information is configured for determining the primary cell, then the primary cell is activated.

For another example, if the indication information is configured for determining the SCGs and for determining the primary cell, then the primary cell is activated and the SCGs are activated in the active time duration.

For another example, if the indication information is configured for determining the SCGs and for determining the activation time of the SCGs, then the SCGs are activated at the activation time of the SCGs within the active time duration.

For another example, if the indication information is configured for determining the SCGs, the primary cell and the activation time of the primary cell, then the primary cell is activated at the activation time of the primary cell and the SCGs are activated in the active time duration.

For another example, if the indication information is configured for determining the SCGs and the activation time of the SCGs, and for determining the primary cell and the activation time of the primary cell, then the SCGs are activated at the activation time of the SCGs within the active time duration, and the primary cell is activated at the activation time of the primary cell.

For the implementation method of determining the SCGs, the activation time of the SCGs, the primary cell and the activation time of the primary cell by the indication information, please refer to the above examples, which will not be repeated here.

Please refer to FIG. 3, which is a schematic flowchart of a cell activation method according to another embodiment of the present application.

As shown in FIG. 3, the method includes the following steps.

S201: receiving DRX configuration information.

The DRX configuration information includes a DRX cycle (cycle). One DRX cycle includes an active time duration and/or an outside-active time duration, and the outside-active time duration is a time duration except the active time duration in one DRX cycle.

In some embodiments, the DRX configuration information may be sent by the network device to the terminal device when the terminal device accesses the network device for the first time.

The DRX configuration information may be radio resource control (RRC) information.

S202: receiving indication information, where the indication information is configured for determining SCGs to be activated and/or activation time.

For the description of S202, please refer to S101, which will not be repeated here.

S203: activating the SCGs according to the indication information.

For the description of S203, please refer to S102, which will not be repeated here.

In some embodiments, the SCGs include: at least one secondary cell group for dormancy outside active time (Scell-groups-for-dormancy-outside-active-time); and/or at least one secondary cell dormancy within active time group for dormancy within active time (Scell-groups-for-dormancy-within-active-time).

In a specific implementation, the SCGs may include any one of the following: one secondary cell group for dormancy outside active time;

a plurality of secondary cell groups for dormancy outside active time;

one secondary cell group for dormancy within active time;

a plurality of secondary cell groups for dormancy within active time;

one secondary cell group for dormancy within active time and one secondary cell group for dormancy outside active time;

one secondary cell group for dormancy outside active time and a plurality of secondary cell groups for dormancy within active time;

a plurality of secondary cell groups for dormancy outside active time and one secondary cell group for dormancy within active time;

a plurality of secondary cell groups for dormancy outside active time and a plurality of secondary cell groups for dormancy within active time.

That is, in the embodiments of the present application, the terminal device can monitor: one secondary cell group for dormancy outside active time; a plurality of secondary cell groups for dormancy outside active time; one secondary cell group for dormancy within active time: a plurality of secondary cell groups for dormancy within active time; one secondary cell group for dormancy outside active time and one secondary cell group for dormancy within active time; one secondary cell group for dormancy outside active time and a plurality of secondary cell groups for dormancy within active time; a plurality of secondary cell groups for dormancy outside active time and one secondary cell group for dormancy within active time; a plurality of secondary cell groups for dormancy outside active time and a plurality of secondary cell groups for dormancy within active time, etc.

In some embodiments, the secondary cell group for dormancy outside active time includes one or more Scells; and/or the secondary cell group for dormancy within active time includes one or more Scells.

The secondary cell group for dormancy outside active time may be one or more secondary cell groups SCGs formed by all of secondary cells or part of secondary cells configured by the network device.

The secondary cell group for dormancy within active time may be one or more secondary cell groups SCGs formed by all of the secondary cells or part of the secondary cells configured by the network device.

A secondary cell may belong to a secondary cell group for dormancy outside active time and/or a secondary cell group for dormancy within active time. Specifically, a secondary cell may only belong to SCGs in the secondary cell groups for dormancy outside active time; or a secondary cell may only belong to SCGs in the secondary cell groups for dormancy within active time; or a secondary cell may belong to both SCGs in the secondary cell groups for dormancy outside active time and SCGs in the secondary cell groups for dormancy within active time.

In some embodiments, one preset bit can be configured for determining the SCGs in the secondary cell groups for dormancy outside active time and/or the SCGs in the secondary cell groups for dormancy within active time.

In some embodiments, a plurality of preset bits can be configured for determining the SCGs in the secondary cell groups for dormancy outside active time and/or the SCGs in the secondary cell groups for dormancy within active time.

In some embodiments, there is an SCG of the secondary cell groups for dormancy outside active time and/or an SCG of the secondary cell groups for dormancy within active time, and it is indicated to the terminal device through one preset bit to activate the SCG of the secondary cell groups for dormancy outside active time and/or the SCG of the secondary cell groups for dormancy within active time.

In some embodiments, there are a plurality of SCGs of the secondary cell groups for dormancy outside active time and/or a plurality of SCGs of the secondary cell groups for dormancy within active time, and it is indicated to the terminal device through a plurality of preset bits to activate the plurality of SCGs of the secondary cell groups for dormancy outside active time and/or activate the plurality of SCGs of the secondary cell groups for dormancy within active time.

In some embodiments, there are a plurality of SCGs of the secondary cell groups for dormancy outside active time and/or a plurality of SCGs of the secondary cell groups for dormancy within active time, and it is indicated to the terminal device through a plurality of preset bits to activate the SCGs of the secondary cell groups for dormancy outside active time and/or activate the SCGs of the secondary cell groups for dormancy within active time, where one of the plurality of preset bits is configured for confirming the SCGs.

In some embodiments, the activation time of the first SCG may be determined by one preset bit, the activation time of the first SCG and the activation time of the second SCG may also be determined by two preset bits respectively, and so on, which will not be repeated here.

In some embodiments, the activation time of the SCGs and the activation time of the primary cell are determined by two preset bits.

In some embodiments, the activation time of the primary cell is determined by one preset bit, that is, the activation time of the primary cell can be delayed via the preset bit.

In some embodiments, all secondary cells in the secondary cell groups for dormancy outside active time or in the secondary cell groups for dormancy within active time are activated.

In another possible scenario, the activated SCGs may be the secondary cells of a part of the secondary cell groups for dormancy outside active time and/or the secondary cells of a part of the secondary cell group for dormancy within active time. For example, two secondary cell groups (SCGs) for dormancy within active time whose numbers are relatively close to the beginning of numbering are activated and two secondary cell groups (SCGs) for dormancy within active time whose numbers are relatively close to the beginning of numbering are activated, which is not limited in the embodiments of the present application.

Specifically, for definition of at least one secondary cell group for dormancy outside active time; and/or, the method of at least one secondary cell group for dormancy within active time, please refer to the above examples, which will not be repeated here.

According to another aspect of the embodiments of the present application, embodiments of the present application further provide a cell activation method, which can be applied to a terminal device.

Please refer to FIG. 4, which is a schematic flowchart of a cell activation method according to another embodiment of the present application.

As shown in FIG. 4, the method includes the following steps.

S301: receiving indication information, where the indication information is configured for determining SCGs to be activated and/or activation time of a primary cell.

An execution entity of the embodiment of the present application may be a terminal device, and the description of the above examples can be referred to for the description of types of the terminal device, which will not be repeated here.

For example, when the cell activation method of the embodiment of the present application is applied to the application scenario as shown in FIG. 1, the execution entity of the embodiment of the present application may be the mobile phone as shown in FIG. 1.

In this embodiment, the cell activation method of the embodiment of the present application is exemplarily expounded by taking the mobile phone as an example of the terminal device.

That is, in the embodiment of the present application, the mobile phone can receive the indication information sent by the network device, such as a PDCCH-WUS. In some embodiments, the indication information can be configured for determining the SCGs to be activated. In some other embodiments, the indication information can be configured for determining the activation time of the primary cell. In some other embodiments, the indication information can be configured for determining the SCGs and the activation time of the primary cell.

S302: activating the SCGs and/or the primary cell according to the indication information.

Based on the above example, in this step, when receiving the indication information, the mobile phone can activate the SCGs, or activate the primary cell; or activate both the SCGs and the primary cell.

It should be noted that in the above example, the mobile phone is taken as an example only for exemplary explanation, which cannot be understood as a limitation on the execution entity of the cell activation method in the embodiments of the present application.

In this embodiment, as the terminal device (such as the mobile phone in the above example) can activate the SCGs according to the indication information and/or the primary cell, the terminal device can determine the SCGs and/or the primary cell conveniently and quickly according to the indication information and activate the SCGs and/or the primary cell, which can reduce interaction resources between the terminal device and the network device, and save energy consumption for activation by the terminal device.

Based on the above analysis, the embodiments of the present application provide a new cell activation method, which includes: receiving the indication information, where the indication information is configured for determining the SCGs to be activated and/or the primary cell, and activating the SCGs and/or the primary cell according to the indication information. By determining the SCGs to be activated and/or the primary cell through the indication information, flexibility of the indication information being used for indication can be improved, a technical effect of improving reliability of activating the SCGs and/or the primary cell by the terminal device can be achieved, and a technical effect of reducing activation latency can also be achieved.

In some embodiments, the indication information includes at least one first preset bit or at least one first preset indication field, and the first preset bit or the first preset indication field is configured for determining the SCGs to be activated.

That is, in some embodiments, the indication information may include one or more first preset bits, and the SCGs are determined by the one or more first preset bits.

In some other embodiments, the indication information may include one or more first preset indication fields, and the SCGs are determined by the one or more first preset indication fields.

In some embodiments, the indication information further includes at least one second preset bit or at least one second preset indication field, and the second preset bit or the second preset indication field is configured for determining the activation time of the SCGs.

That is, in some embodiments, the indication information may include one or more second preset bits, and the activation time of the SCGs is determined by the one or more second preset bits.

In some other embodiments, the indication information may include one or more second preset indication fields, and the activation time of the SCGs is determined by the one or more second preset indication fields.

Based on the above examples, it can be known that in this embodiment, through the indication information, the SCGs can be determined by at least one first preset bit, and the activation time of the SCGs can be determined by at least one second preset bit. The SCGs can also be determined by at least one first preset bit, and the activation time of the SCGs can be determined by at least one second preset indication field. The SCGs can also be determined by at least one first preset indication field, and the activation time of the SCGs can be determined by at least one second preset bit. The SCGs can also be determined by at least one first preset indication field, and the activation time of the SCGs can be determined by at least one second preset indication field.

Of course, in some embodiments, based on the above examples, the activation time of the primary cell can also be determined through the indication information.

In some embodiments, the indication information further includes at least one scrambled bit, and the scrambled bit is configured for determining the activation time of the primary cell.

That is, in the embodiments of the present application, the indication information may include one scrambled bit, and the activation time of the primary cell is determined by the one scrambled bit. The indication information may include a plurality of scrambled bits, and the activation time of the primary cell is determined by one or more of the scrambled bits.

Based on the above examples, it can be known that in this embodiment, through the indication information, the SCGs can be determined by at least one first preset bit, the activation time of the SCGs can be determined by at least one second preset bit, and the activation time of the primary cell can be determined by at least one scrambled bit. The SCGs can also be determined by at least one first preset bit, the activation time of the SCGs can be determined by at least one second preset indication field, and the activation time of the primary cell can be determined by at least one scrambled bit. The SCGs can also be determined by at least one first preset indication field, the activation time of the SCGs can be determined by at least one second preset bit, and the activation time of the primary cell can be determined by at least one scrambled bit. The SCGs can also be determined by at least one first preset indication field, the activation time of the SCGs can be determined by at least one second preset indication field, and the activation time of the primary cell can be determined by at least one scrambled bit.

In some embodiments, the indication information further includes at least one third preset bit or at least one third preset indication field, and the third preset bit or the third preset indication field is configured for determining the activation time of the primary cell.

That is, in the embodiments of the present application, the indication information may include one or more third preset bits, and the activation time of the primary cell is determined by the one or more third preset bits. The indication information may also include one or more third preset indication fields, and the activation time of the primary cell is determined by the one or more third preset indication fields.

Based on the above examples, it can be known that in this embodiment, through the indication information, the SCGs can be determined by at least one first preset bit, and the activation time of the primary cell can also be determined by at least one third preset bit. Through the indication information, the SCGs can be determined by at least one first preset bit, and the activation time of the primary cell can be determined by at least one third indication field.

In some embodiments, the indication information includes at least one fourth preset bit or at least one fourth preset indication field, and the fourth preset bit or the fourth preset indication field is configured for determining the primary cell.

That is, in the embodiments of the present application, the indication information may include one or more fourth preset bits, and the primary cell is determined according to the one or more fourth preset bits. The indication information may also include one or more fourth preset indication fields, and the primary cell is determined according to the one or more fourth preset indication fields.

Based on the above examples, it can be known that in the embodiments of the present application, through the indication information, the SCGs can be determined, and the primary cell can be determined by at least one fourth preset bit. The SCGs can also be determined, and the primary cell can be determined by at least one fourth preset indication field. The SCGs can be determined by at least one first preset bit, and the primary cell can be determined by at least one fourth preset bit. The SCGs can be determined by at least one first preset bit, and the primary cell can be determined by at least one fourth preset indication field. The SCGs can also be determined by at least one first preset indication field, and the primary cell can be determined by at least one fourth preset bit. The SCGs can also be determined by at least one first preset indication field, and the primary cell can be determined by at least one fourth preset indication field.

The SCGs can be determined by at least one first preset bit, the primary cell can be determined by at least one fourth preset bit, and the activation time of the SCGs can be determined by at least one second preset bit. The SCGs can be determined by at least one first preset bit, the primary cell can be determined by at least one fourth preset bit, and the activation time of the SCGs can be determined by at least one second preset indication field. The SCGs can be determined by at least one first preset bit, the primary cell can be determined by at least one fourth preset indication field, and the activation time of the SCGs can be determined by at least one second preset bit. The SCGs can be determined by at least one first preset bit, the primary cell can be determined by at least one fourth preset indication field, and the activation time of the SCGs can be determined by at least one second preset indication field. The SCGs can also be determined by at least one first preset indication field, the primary cell can be determined by at least one fourth preset bit, and the activation time of the SCGs can be determined by at least one second preset bit. The SCGs can also be determined by at least one first preset indication field, the primary cell can be determined by at least one fourth preset bit, and the activation time of the SCGs can be determined by at least one second preset indication field. The SCGs can also be determined by at least one first preset indication field, the primary cell can be determined by at least one fourth preset indication field, and the activation time of the SCGs can be determined by at least one second preset bit. The SCGs can also be determined by at least one first preset indication field, the primary cell can be determined by at least one fourth preset indication field, and the activation time of the SCGs can be determined by at least one second preset indication field.

The SCGs can be determined by at least one first preset bit, the primary cell can be determined by at least one fourth preset bit, the activation time of the SCGs can be determined by at least one second preset bit, and the activation time of the primary cell can be determined by at least one scrambled bit. The SCGs can be determined by at least one first preset bit, the primary cell can be determined by at least one fourth preset bit, the activation time of the SCGs can be determined by at least one second preset indication field, and the activation time of the primary cell can be determined by at least one scrambled bit. The SCGs can be determined by at least one first preset bit, the primary cell can be determined by at least one fourth preset indication field, the activation time of the SCGs can be determined by at least one second preset bit, and the activation time of the primary cell can be determined by at least one scrambled bit. The SCGs can be determined by at least one first preset bit, the primary cell can be determined by at least one fourth preset indication field, the activation time of the SCGs can be determined by at least one second preset indication field, and the activation time of the primary cell can be determined by at least one scrambled bit. The SCGs can also be determined by at least one first preset indication field, the primary cell can be determined by at least one fourth preset bit, the activation time of the SCGs can be determined by at least one second preset bit, and the activation time of the primary cell can be determined by at least one scrambled bit. The SCGs can be determined by at least one first preset indication field, the primary cell can be determined by at least one fourth preset indication field, the activation time of the SCGs can be determined by at least one second preset bit, and the activation time of the primary cell can be determined by at least one scrambled bit. The SCGs can be determined by at least one first preset indication field, the primary cell can be determined by at least one fourth preset indication field, the activation time of the SCGs can be determined by at least one second preset indication field, and the activation time of the primary cell can be determined by at least one scrambled bit.

The SCGs can be determined by at least one first preset bit, the primary cell can be determined by at least one fourth preset bit, the activation time of the SCGs can be determined by at least one second preset bit, and the activation time of the primary cell can be determined by at least one third preset bit. The SCGs can be determined by at least one first preset bit, the primary cell can be determined by at least one fourth preset bit, the activation time of the SCGs can be determined by at least one second preset bit, and the activation time of the primary cell can be determined by at least one third preset indication field. The SCGs can be determined by at least one first preset bit, the primary cell can be determined by at least one fourth preset bit, the activation time of the SCGs can be determined by at least one second preset indication field, and the activation time of the primary cell can be determined by at least one third preset bit. The SCGs can be determined by at least one first preset bit, the primary cell can be determined by at least one fourth preset bit, the activation time of the SCGs can be determined by at least one second preset indication field, and the activation time of the primary cell can be determined by at least one third preset indication field.

The SCGs can be determined by at least one first preset bit, the primary cell can be determined by at least one fourth preset indication field, the activation time of the SCGs can be determined by at least one second preset bit, and the activation time of the primary cell can be determined by at least one third preset bit. The SCGs can be determined by at least one first preset bit, the primary cell can be determined by at least one fourth preset indication field, the activation time of the SCGs can be determined by at least one second preset bit, and the activation time of the primary cell can be determined by at least one third preset indication field. The SCGs can be determined by at least one first preset bit, the primary cell can be determined by at least one fourth preset indication field, the activation time of the SCGs can be determined by at least one second preset indication field, and the activation time of the primary cell can be determined by at least one third preset bit. The SCGs can be determined by at least one first preset bit, the primary cell can be determined by at least one fourth preset indication field, the activation time of the SCGs can be determined by at least one second preset indication field, and the activation time of the primary cell can be determined by at least one third preset indication field.

The SCGs can also be determined by at least one first preset indication field, the primary cell can be determined by at least one fourth preset bit, the activation time of the SCGs can be determined by at least one second preset bit, and the activation time of the primary cell can be determined by at least one third preset bit. The SCGs can also be determined by at least one first preset indication field, the primary cell can be determined by at least one fourth preset bit, the activation time of the SCGs can be determined by at least one second preset bit, and the activation time of the primary cell can be determined by at least one third preset indication field. The SCGs can be determined by at least one first preset indication field, the primary cell can be determined by at least one fourth preset bit, the activation time of the SCGs can be determined by at least one second preset indication field, and the activation time of the primary cell can be determined by at least one third preset bit. The SCGs can also be determined by at least one first preset indication field, the primary cell can be determined by at least one fourth preset bit, the activation time of the SCGs can be determined by at least one second preset indication field, and the activation time of the primary cell can be determined by at least one third preset indication field. The SCGs can be determined by at least one first preset indication field, the primary cell can be determined by at least one fourth preset indication field, the activation time of the SCGs can be determined by at least one second preset bit, and the activation time of the primary cell can be determined by at least one third preset bit. The SCGs can be determined by at least one first preset indication field, the primary cell can be determined by at least one fourth preset indication field, the activation time of the SCGs can be determined by at least one second preset bit, and the activation time of the primary cell can be determined by at least one third preset indication field. The SCGs can be determined by at least one first preset indication field, the primary cell can be determined by at least one fourth preset indication field, the activation time of the SCGs can be determined by at least one second preset indication field, and the activation time of the primary cell can be determined by at least one third preset bit. The SCGs can be determined by at least one first preset indication field, the primary cell can be determined by at least one fourth preset indication field, the activation time of the SCGs can be determined by at least one second preset indication field, and the activation time of the primary cell can be determined by at least one third preset indication field.

In some embodiments, S302 includes: activating the SCGs in an active time duration.

Based on the above examples, it can be seen that the terminal device can activate the SCGs in the active time duration based on the indication information, and can also activate the SCGs at the activation time of the SCGs within the active time duration. For the description of the active time duration and the activation time of the SCGs, please refer to the above examples, which will not be repeated here.

Please refer to FIG. 5, which is a schematic flowchart of a cell activation method according to another embodiment of the present application.

As shown in FIG. 5, the method includes the following steps.

S401: receiving DRX configuration information.

For the description of S401, please refer to S201, which will not be repeated here.

S402: receiving indication information, where the indication information is configured for determining SCGs to be activated and/or activation time of a primary cell.

For the description of S402, please refer to S301, which will not be repeated here.

S403: activating the SCGs and/or the primary cell according to the indication information.

For the description of S403, please refer to S302, which will not be repeated here.

Similarly, in the embodiments of the present application, the SCGs include: at least one secondary cell group for dormancy outside active time; and/or at least one secondary cell group for dormancy within active time. For the description of the at least one secondary cell group for dormancy outside active time and/or the at least one secondary cell group for dormancy within active time, please refer to the above examples. The above examples can also be referred to for the principles of determining at least one secondary cell group for dormancy outside active time and/or at least one secondary cell group for dormancy within active time through the indication information, which will not be repeated here.

According to another aspect of the embodiments of the present application, embodiments of the present application also provide a cell activation method, which is applied to a network device. The method includes:

sending indication information, where the indication information is configured for determining SCGs to be activated and/or activation time.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining the activation time of the SCGs; and/or, the indication information includes at least one scrambled bit, and the scrambled bit is configured for determining the activation time of the primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

the activation time of the SCGs, the activation time of the primary cell.

In some embodiments, the indication information includes at least one preset bit, and the preset bit is configured for determining the activation time of the SCGs; and/or, the indication information includes at least one scrambled bit, and the scrambled bit is configured for determining the activation time of the primary cell.

In some embodiments, the indication information includes at least one third preset bit, and the third preset bit is configured for determining the activation time of the primary cell.

In some embodiments, the indication information further includes a fourth preset bit or a third preset indication field, and the fourth preset bit or the third preset indication field is configured for determining a primary cell to be activated.

In some embodiments, the method further includes:

sending DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

According to another aspect of the embodiments of the present application, embodiments of the present application also provide a cell activation method, which is applied to a network device. The method includes:

sending indication information, where the indication information is configured for determining SCGs to be activated and/or activation time of a primary cell.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or at least one third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the method further includes:

sending DRX configuration information, where the configuration information is configured for determining an active time duration and/or an outside-active time duration.

In order to make readers understand the cell activation method of the embodiments of the present application more deeply, interactive flow of the cell activation method of the embodiments of the present application is now exemplarily described with reference to FIG. 6 and FIG. 7.

As shown in FIG. 6, the cell activation method includes the following steps.

S1: a network device sends indication information to a terminal device, where the indication information is configured for determining SCGs to be activated and/or activation time.

Accordingly, the terminal device receives the indication information sent by the network device, such as a PDCCH-WUS.

S2: the terminal device activates the SCGs according to the indication information.

As shown in FIG. 7, the cell activation method includes the following steps.

S11: a network device sends indication information to a terminal device, where the indication information is configured for determining SCGs to be activated and/or activation time of a primary cell.

Accordingly, the terminal device receives the indication information sent by the network device, such as a PDCCH-WUS.

S12: the terminal device activates the SCGs and/or the primary cell according to the indication information.

For the description of the content of the indication information itself and the content determined by the indication information, please refer to the above examples, which will not be repeated here.

According to another aspect of the embodiments of the present application, embodiments of the present application also provide a terminal device.

Please refer to FIG. 8, which is a schematic diagram of a terminal device according to an embodiment of the present application.

As shown in FIG. 8, the terminal device includes:

a first receiving module 11, configured to receive indication information, where the indication information is configured for determining SCGs to be activated and/or activation time;

a first activating module 12, configured to activate the SCGs according to the indication information.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining the activation time of the SCGs; and/or.

the indication information includes at least one scrambled bit, and the scrambled bit is configured for determining the activation time of the primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

the activation time of the SCGs, the activation time of the primary cell.

In some embodiments, the indication information includes at least one preset bit, and the preset bit is configured for determining the activation time of the SCGs; and/or, the indication information includes at least one scrambled bit, and the scrambled bit is configured for determining the activation time of the primary cell.

In some embodiments, the indication information includes at least one third preset bit, and the third preset bit is configured for determining the activation time of the primary cell.

In some embodiments, the indication information further includes a fourth preset bit or a third preset indication field, and the fourth preset bit or the third preset indication field is configured for determining a primary cell to be activated.

In some embodiments, the first activating module 12 is configured to activate the SCGs and/or the primary cell according to the indication information.

In some embodiments, the first activating module 12 is configured to activate the SCGs in an active time duration according to the indication information.

In some embodiments, the first receiving module 11 is configured to receive DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

In another aspect, embodiments of the present application provide a terminal device.

Figure 9:
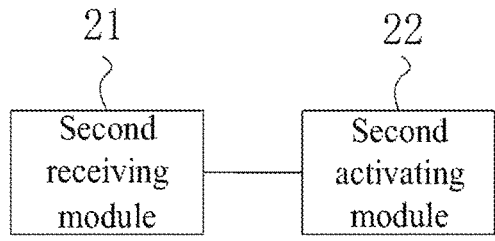
FIG. 9 is a schematic diagram of a terminal device according to another embodiment of the present application.

Please refer to FIG. 9, which is a schematic diagram of a terminal device according to another embodiment of the present application.

As shown in FIG. 9, the terminal device includes:

a second receiving module 21, configured to receive indication information, where the indication information is configured for determining SCGs to be activated and/or activation time of a primary cell;

a second activating module 22, configured to activate the SCGs and/or the primary cell according to the indication information.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the second activating module 22 is configured to activate the SCGs in an active time duration.

In some embodiments, the second receiving module 21 is configured to receive DRX configuration information, where the configuration information is configured for determining an active time duration and/or an outside-active time duration.

In another aspect, embodiments of the present application provide a network device. The network device includes:

a third sending module, configured to send indication information, where the indication information is configured for determining SCGs to be activated and/or activation time.

In some embodiments, the indication information includes at least one first preset bit, and the first preset bit is configured for determining the SCGs.

In some embodiments, the indication information further includes at least one second preset bit, and the second preset bit is configured for determining at least one of the following:

activation time of the SCGs, activation time of a primary cell.

In some embodiments, the indication information includes at least one preset indication field, and the preset indication field is configured for determining the activation time of the SCGs; and/or, the indication information includes at least one scrambled bit, and the scrambled bit is configured for determining the activation time of the primary cell.

In some embodiments, the indication information includes at least one first preset indication field, and the first preset indication field is configured for determining the SCGs.

In some embodiments, the indication information includes at least one second preset indication field, and the second preset indication field is configured for determining at least one of the following:

the activation time of the SCGs, the activation time of the primary cell.

In some embodiments, the indication information includes at least one preset bit, and the preset bit is configured for determining the activation time of the SCGs; and/or, the indication information includes at least one scrambled bit, and the scrambled bit is configured for determining the activation time of the primary cell.

In some embodiments, the indication information includes at least one third preset bit, and the third preset bit is configured for determining the activation time of the primary cell.

In some embodiments, the indication information further includes a fourth preset bit or a third preset indication field, and the fourth preset bit or the third preset indication field is configured for determining a primary cell to be activated.

In some embodiments, the third sending module is configured to send DRX configuration information, where the configuration information is configured for determining an active time duration and/or an outside-active time duration.

In some embodiments, the SCGs include:

at least one secondary cell group for dormancy outside active time; and/or at least one secondary cell group for dormancy within active time.

In another aspect, embodiments of the present application provide a network device. The network device includes:

a fourth sending module, configured to send indication information, where the indication information is configured for determining SCGs to be activated and/or activation time of a primary cell.

In some embodiments, the indication information includes at least one first preset bit or at least one first preset indication field, and the first preset bit or the first preset indication field is configured for determining the SCGs to be activated.

In some embodiments, the indication information further includes at least one second preset bit or at least one second preset indication field, and the second preset bit or the second preset indication field is configured for determining activation time of the SCGs.

In some embodiments, the indication information further includes at least one scrambled bit, and the scrambled bit is configured for determining the activation time of the primary cell.

In some embodiments, the indication information further includes at least one third preset bit or at least one third preset indication field, and the third preset bit or the third preset indication field is configured for determining the activation time of the primary cell.

In some embodiments, the indication information includes at least one fourth preset bit or at least one fourth preset indication field, and the fourth preset bit or the fourth preset indication field is configured for determining the primary cell.

In some embodiments, the fourth sending module is configured to send DRX configuration information, where the configuration information is configured for determining an active time duration and/or an outside-active time duration.

The present application also provides a system, which includes the terminal device as described in any of the above embodiments and the network device as described in any of the above embodiments.

The present application also provides a device, which includes a memory, a processor and a computer program stored in the memory and capable of running on the processor. When the computer program is executed by the processor, the steps of the method as described above are implemented.

Figure 10:
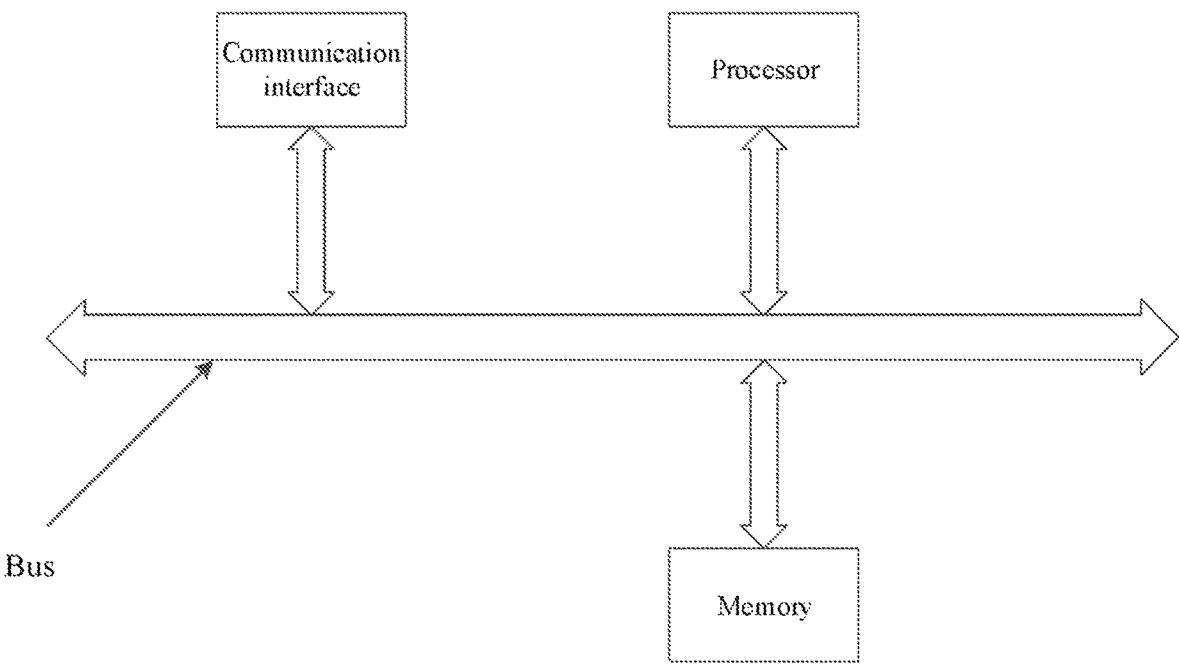
FIG. 10 is a schematic structural diagram of a device according to an embodiment of the present application.

Please refer to FIG. 10, which is a schematic structural diagram of a device according to an embodiment of the present application.

As shown in FIG. 10, the device includes a memory and a processor, and may also include a communication interface and a bus, where the processor, the communication interface and the memory are connected through the bus. The processor is configured to execute executable modules, such as computer programs, stored in the memory.

The memory may include a high-speed random access memory (RAM) or a non-volatile memory, such as at least one disk memory. Communication connection between network elements of the system and at least one other network element is realized through at least one communication interface (which may be wired or wireless). Internet, wide area network, local network, metropolitan area network and the like may be used.

The bus may be an ISA bus, a PCI bus or an EISA bus, etc. The bus may be divided into an address bus, a data bus, a control bus, etc.

The memory is configured to store a program, and the processor executes the program after receiving an execution instruction. The method disclosed in any of the above embodiments of the present application can be applied to or implemented by the processor.

The processor may be an integrated circuit chip with signal processing capability. In the process of implementation, the steps of the above method can be completed by hardware integrated logic circuits or instructions in a form of software in the processor. The processor may be a general-purpose processor, including a central processing unit (CPU), a network processor (NP), etc. The processor may also be a digital signal processing (DSP), an application specific integrated circuit (ASIC), a field-programmable gate array (FPGA) or other programmable logic devices, discrete gates or transistor logic devices, discrete hardware components. The steps of the method disclosed in the embodiments of the present application may be directly embodied as being performed by a hardware coding processor, or performed by a combination of hardware and software modules in the coding processor. Software modules can be located in a random access memory, a flash memory, a read-only memory, a programmable read-only memory or an electrically erasable programmable memory, a register or other mature storage media in this field. A storage medium is located in the memory, and the processor reads information in the memory and complete the steps of the above method in combination with its hardware.

The present application also provides a computer storage medium, where a computer program is stored on the computer storage medium, and when the computer program is executed by a processor, the steps of the method as described above are implemented.

An embodiment of the present application also provides a computer program product, which includes computer program code, and when the computer program code is executed on a computer, the computer is caused to execute the method as described in the above various possible embodiments.

An embodiment of the present application also provides a chip, which includes a memory and a processor, where the memory is configured to store a computer program, and the processor is configured to call and run the computer program from the memory, so that a device installed with the chip executes the method as described in the above various possible embodiments.

Other embodiments of the present application will easily occur to those skilled in the art after considering the specification and practicing the application disclosed herein. The embodiments of the present application are intended to cover any variations, usage or adaptive changes of the present application, which follow the general principles of the present application and include common knowledge or conventional technical means in this technical field that are not disclosed in the present application. The specification and examples are to be regarded as exemplary only, with the true scope and spirit of the present application being indicated by the following claims.

It should be understood that the present application is not limited to the precise structures described above and shown in the drawings, and various modifications and changes can be made without departing from its scope. The scope of the present application is limited only by the appended claims.

The invention claimed is:

1. A method of cell activation, wherein the method is applied to a terminal device, and the method comprises:
  receiving discontinuous reception (DRX) configuration, wherein the DRX configuration is used to determine an active time duration of the terminal device and/or an outside-active time duration of the terminal device;
  receiving indication information, wherein the indication information is used to determine secondary cell groups (SCGs) to be activated and activation time; wherein the SCGs comprise: at least one secondary-cell-group-for-dormancy within the outside-active time duration of the terminal device; and/or at least one secondary-cell-group-for-dormancy within the active time duration of the terminal device; and
  activating the SCGs in the activation time according to the indication information.

2. The method according to claim 1, wherein the indication information comprises at least one first preset bit, and the first preset bit is used to determine the SCGs;
  wherein the indication information further comprises at least one second preset bit, and the second preset bit is used to determine at least one of activation time of the SCGs or activation time of a primary cell; or
  wherein the indication information comprises at least one preset indication field, and the preset indication field is used to determine activation time of the SCGs; and/or the indication information comprises at least one scrambled bit, and the scrambled bit is used to determine the activation time of the primary cell.

3. The method according to claim 1, wherein the indication information comprises at least one first preset indication field, and the first preset indication field is used to determine the SCGs.

4. The method according to claim 3, wherein the indication information further comprises at least one second preset indication field, and the second preset indication field is used to determine at least one of activation time of the SCGs or activation time of a primary cell; or
  wherein the indication information further comprises at least one preset bit, and the preset bit is used to determine the activation time of the SCGs; and/or the indication information further comprises at least one scrambled bit, and the scrambled bit is used to determine the activation time of the primary cell.

5. The method according to claim 1, wherein the indication information comprises at least one third preset bit, and the third preset bit is used to determine activation time of a primary cell.

6. The method according to claim 1, wherein the indication information comprises a fourth preset bit or a third preset indication field, and the fourth preset bit or the third preset indication field is used to determine a primary cell to be activated; and
  wherein the activating the SCGs in the activation time according to the indication information comprises:
  activating the SCGs and/or the primary cell in the activation time according to the indication information.

7. The method according to claim 1, wherein the activating the SCGs in the activation time according to the indication information comprises:
  activating the SCGs in the active time duration of the terminal device according to the indication information;
  wherein the activation time is the active time duration or a partial time duration within the active time duration.

8. A device, comprising: a processor and a memory;
  the memory stores computer execution instructions;
  when the computer execution instructions are executed by the processor, the method of cell activation according to claim 1 is implemented.

9. A system, comprising:
  at least one terminal device for implementing the method according to claim 1; and,
  at least one network device for implementing the following operation: sending the indication information, wherein the indication information is used to determine the SCGs to be activated and/or activation time.

10. A method of cell activation, wherein the method is applied to a terminal device, and the method comprises:
  receiving discontinuous reception (DRX) configuration, wherein the DRX configuration is used to determine an active time duration of the terminal device and/or an outside-active time duration of the terminal device;
  receiving indication information, wherein the indication information is used to determine secondary cell groups (SCGs) to be activated and activation time of a primary cell; wherein the SCGs comprise: at least one secondary-cell-group-for-dormancy within the outside-active time duration of the terminal device; and/or at least one secondary-cell-group-for-dormancy within the active time duration of the terminal device; and
  activating the SCGs and/or the primary cell in the activation time according to the indication information.

11. The method according to claim 10, wherein the indication information comprises at least one first preset bit or at least one first preset indication field, and the first preset bit or the first preset indication field is used to determine the SCGs to be activated.

12. The method according to claim 11, wherein the indication information further comprises at least one third preset bit or at least one third preset indication field, and the third preset bit or the third preset indication field is used to determine the activation time of the primary cell.

13. The method according to claim 11, wherein the indication information further comprises at least one second preset bit or at least one second preset indication field, and the second preset bit or the second preset indication field is used to determine activation time of the SCGs; and/or
  wherein the indication information further comprises at least one scrambled bit, and the scrambled bit is used to determine the activation time of the primary cell.

14. The method according to claim 10, wherein the indication information comprises at least one fourth preset bit or at least one fourth preset indication field, and the fourth preset bit or the fourth preset indication field is used to determine the primary cell.

15. A device, comprising: a processor and a memory;

the memory stores computer execution instructions;

when the computer execution instructions are executed by the processor, the method of cell activation according to claim 10 is implemented.

16. A method of cell activation, wherein the method is applied to a network device, and the method comprises:

sending discontinuous reception (DRX) configuration, wherein the DRX configuration is used to determine an active time duration of a terminal device and/or an outside-active time duration of the terminal device;

sending indication information, wherein the indication information is used to determine secondary cell groups (SCGs) to be activated and activation time; wherein the SCGs comprise: at least one secondary-cell-group-for-dormancy within the outside-active time duration of the terminal device; and/or at least one secondary-cell-group-for-dormancy within the active time duration of the terminal device.

17. The method according to claim 16, wherein the indication information comprises at least one first preset bit, and the first preset bit is used to determine the SCGs.

18. The method according to claim 17, wherein the indication information further comprises at least one second preset bit, and the second preset bit is used to determine at least one of activation time of the SCGs or activation time of a primary cell; or wherein the indication information further comprises at least one preset indication field, and the preset indication field is used to determine the activation time of the SCGs; and/or the indication information further comprises at least one scrambled bit, and the scrambled bit is used to determine the activation time of the primary cell.

19. The method according to claim 16, wherein the indication information comprises at least one first preset indication field, and the first preset indication field is used to determine the SCGs;

wherein the indication information comprises at least one second preset indication field, and the second preset indication field is used to determine at least one of activation time of the SCGs or activation time of a primary cell; or wherein the indication information comprises at least one preset bit, and the preset bit is used to determine activation time of the SCGs; and/or the indication information comprises at least one scrambled bit, and the scrambled bit is used to determine the activation time of the primary cell.

20. A device, comprising: a processor and a memory;

the memory stores computer execution instructions;

when the computer execution instructions are executed by the processor, the method of cell activation according to claim 16 is implemented.

* * * * *